US009069424B2

(12) United States Patent
Nagata

(10) Patent No.: US 9,069,424 B2
(45) Date of Patent: Jun. 30, 2015

(54) TOUCH PANEL

(75) Inventor: Koji Nagata, Hachioji (JP)

(73) Assignee: JAPAN DISPLAY INC., Tokyo (JP)

( * ) Notice: Subject to any disclaimer, the term of this patent is extended or adjusted under 35 U.S.C. 154(b) by 234 days.

(21) Appl. No.: 13/558,426

(22) Filed: Jul. 26, 2012

(65) Prior Publication Data
US 2013/0027333 A1 Jan. 31, 2013

(30) Foreign Application Priority Data

Jul. 28, 2011 (JP) ................. 2011-164941

(51) Int. Cl.
G06F 3/044 (2006.01)
G06F 3/041 (2006.01)

(52) U.S. Cl.
CPC .............. G06F 3/044 (2013.01); G06F 3/0418 (2013.01)

(58) Field of Classification Search
CPC ........ G06F 3/041; G06F 3/0418; G06F 3/044
USPC ................. 345/173–174; 702/66–78
See application file for complete search history.

(56) References Cited

U.S. PATENT DOCUMENTS

| 5,121,445 | A | * | 6/1992 | Tsujiuchi et al. | ............. | 382/280 |
| 2007/0262969 | A1 | | 11/2007 | Pak | | |
| 2008/0306733 | A1 | | 12/2008 | Ozawa | | |
| 2011/0057890 | A1 | | 3/2011 | Goo et al. | | |
| 2011/0304571 | A1 | * | 12/2011 | Kim et al. | ..................... | 345/173 |

FOREIGN PATENT DOCUMENTS

| CN | 102138121 A | 7/2011 |
| KR | 10-2007-0109360 | 11/2007 |
| KR | 10-2011-0026765 | 3/2011 |
| TW | 200821582 A | 5/2008 |
| TW | 201106074 A | 2/2011 |
| TW | 201120717 A | 6/2011 |

OTHER PUBLICATIONS

Translation of Office Action issued by IPO dated Oct. 28, 2014 of corresponding Taiwanese application No. 101127356.
Chinese Office Action issued by SIPO for Application No. 201210268896.2 mailed Dec. 2, 2014.

* cited by examiner

Primary Examiner — Sahlu Okebato
(74) Attorney, Agent, or Firm — Lowe Hauptman & Ham, LLP

(57) ABSTRACT

Provided is a touch panel with improved anti-noise performance. A continuous drive pulse train is input to a plurality of scanning electrodes for each one scanning period in turns, and a detection pulse train generated at detection electrodes which intersects the scanning electrodes is detected. The detection pulse train is sampled at different intervals to generate a plurality of data sequences. The plurality of data sequences may be generated from the detection pulse train over a plurality of frame periods. A signal strength of each frequency component is compared between the frequency spectra of the plurality of data sequences, and a frequency spectrum in which frequency components having different strengths have been corrected is generated. A detection signal is generated from the corrected frequency spectrum.

9 Claims, 15 Drawing Sheets

FIG.10
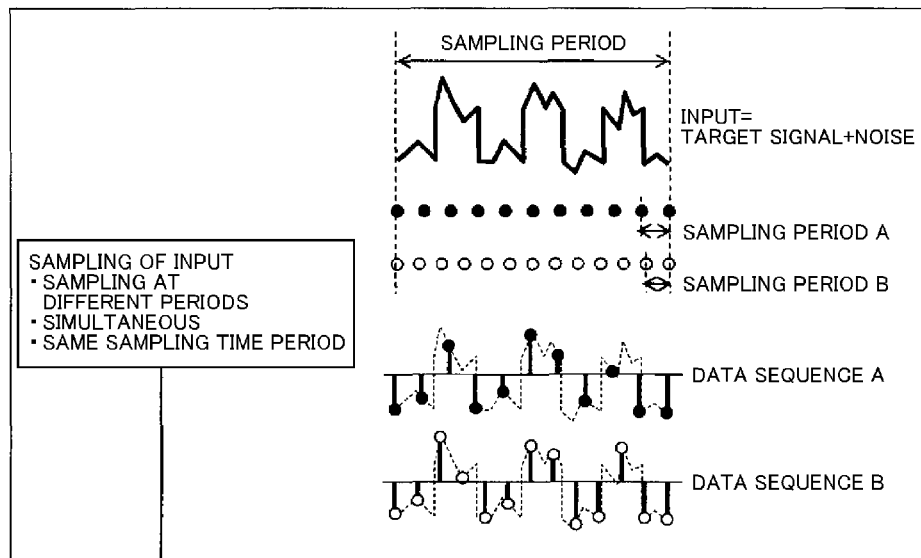
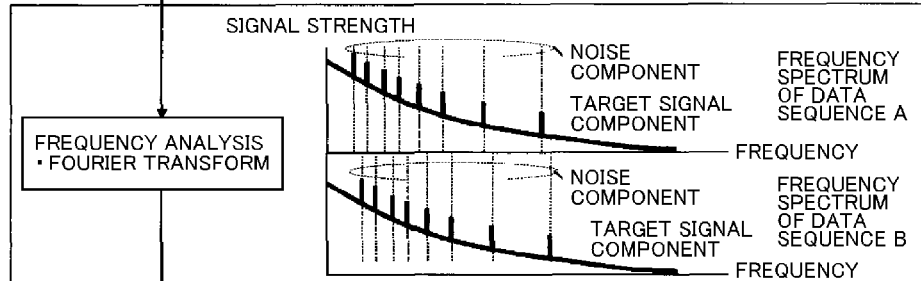
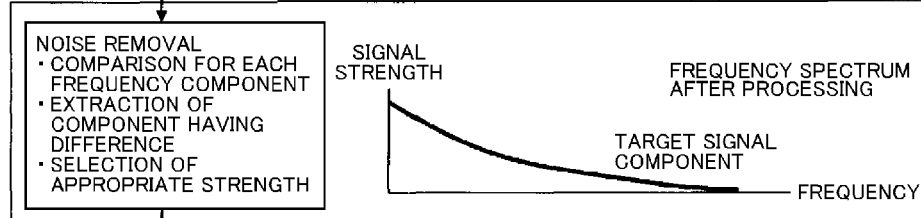

TOUCH PANEL

CROSS-REFERENCE TO RELATED APPLICATION

The present application claims priority from Japanese application JP 2011-164941 filed on Jul. 28, 2011, the content of which is hereby incorporated by reference into this application.

BACKGROUND OF THE INVENTION

1. Field of the Invention

The present invention relates to a touch panel, and more particularly, to a touch panel capable of reducing influence of noise so as to detect a touch position with high precision.

2. Description of the Related Art

A display device which includes a device for inputting information by a touch operation (contact press operation; hereinafter, simply referred to as touch) onto a display screen with the use of a user's finger or a pen (hereinafter, the device is referred to also as touch sensor or touch panel) is used for mobile electronic devices such as a PDA and a mobile terminal, various home electric appliances, an automated teller machine, and other such devices. As the touch panel, there are known a resistive type touch panel that detects a change in resistance at a touched portion, a capacitance type touch panel that detects a change in capacitance, and an optical sensor type touch panel that detects a change in light intensity.

The capacitance type touch panel includes a plurality of detection electrodes extending in a vertical direction (X electrodes) and a plurality of detection electrodes extending in a horizontal direction (Y electrodes), and an input processing portion detects interelectrode capacitances at respective intersections of the X electrodes and the Y electrodes arranged in a matrix. When a conductor such as a finger makes contact with the front surface of the touch panel, the capacitance of an electrode placed at the contact position increases. The input processing portion detects the change in capacitance, and calculates input coordinates based on a signal of the capacitance change detected at each electrode.

SUMMARY OF THE INVENTION

Touch panels including such a capacitance type touch panel are placed on a display, thus causing a malfunction by noise generated by the display. Therefore, a rear surface shielding electrode for reducing noise generated by the display is provided on a rear surface of the touch panel (surface on the display side).

In recent years, cost reduction is required also with regard to the touch panel. Elimination of the rear surface shielding electrode is effective in reducing the cost of the touch panel. In order to carry out the cost reduction measures, it is necessary to improve the anti-noise performance in signal processing.

The present invention has been made based on the above-mentioned requirement, and an object of the present invention is to provide a touch panel with improved anti-noise performance.

The above-mentioned and other objects and novel features of the present invention are made clear by the following description of this specification and the accompanying drawings.

Exemplary embodiments of the invention disclosed herein are briefly outlined as follows.

(1) In order to solve the above-mentioned problem, a touch panel according to the present invention includes: a plurality of scanning electrodes; a plurality of detection electrodes which intersect the plurality of scanning electrodes; first means for inputting a continuous drive pulse train to the plurality of scanning electrodes in turns for each one scanning period; second means for extracting pulses at different intervals from a continuous detection pulse train detected by the plurality of detection electrodes, and for generating at least two data sequences; third means for performing Fourier transform on each of the at least two data sequences to generate a frequency spectrum of the each of the at least two data sequences; fourth means for comparing a signal strength of each frequency component between the frequency spectra of the at least two data sequences, and for generating a frequency spectrum in which frequency components having different strengths have been corrected; and fifth means for performing inverse Fourier transform on the frequency spectrum generated by the fourth means to generate a detection signal from the frequency spectrum generated by the fourth means.

(2) In the touch panel according to the above-mentioned item (1), the third means generates the frequency spectrum from the each of the at least two data sequences over a plurality of frame periods.

(3) In the touch panel according to the above-mentioned item (1) or (2), the fourth means compares a signal strength of each frequency component between the frequency spectra of the at least two data sequences, and adopts, as the signal strength of the frequency components having different strengths, one of a lowest value of the signal strength and an average value of the signal strength between frequency components of the frequency spectra of the at least two data sequences.

(4) In the touch panel according to the above-mentioned item (1) or (2), the intervals of extracting a pulse from the continuous detection pulse train detected at the plurality of detection electrodes are adjustable for each of the at least two data sequences.

(5) In the touch panel according to the above-mentioned item (1) or (2), the at least two data sequences are two data sequences of a first data sequence and a second data sequence.

(6) In the touch panel according to the above-mentioned item (5), the fourth means compares the signal strength of each frequency component between the frequency spectrum of the first data sequence and the frequency spectrum of the second data sequence, and adopts, as the signal strength of the frequency components having different strengths, a value of a lower signal strength of the frequency components of the frequency spectrum of the first data sequence and the frequency components of the frequency spectrum of the second data sequence.

(7) In the touch panel according to any one of the above-mentioned items (1) to (6), the touch panel does not include a shielding electrode on a surface thereof on a display panel side, the touch panel being mountable on the display panel.

BRIEF DESCRIPTION OF THE DRAWINGS

In the accompanying drawings:

FIG. 10 illustrates the method of removing noise of the touch panel according to the embodiment of the present invention;

DETAILED DESCRIPTION OF THE INVENTION

Hereinafter, an embodiment of the present invention is described in detail with reference to the accompanying drawings.

Note that, throughout the drawings illustrating the embodiment, the same reference symbol is given to components having the same function, and repeated description thereof is omitted. Also note that, the following embodiment is not intended to limit the interpretation of the scope of claims of the present invention.

First Embodiment

Figure 1:
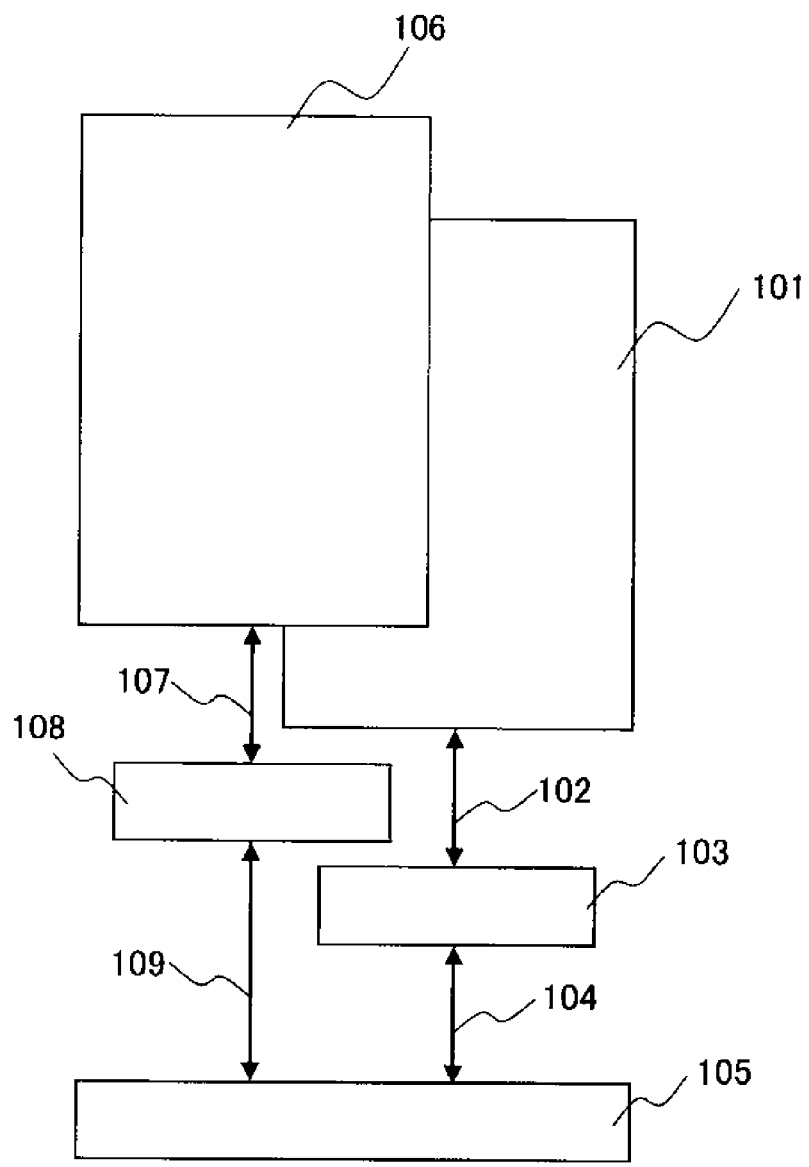
FIG. 1 is a block diagram illustrating a schematic structure of a display with a touch panel on which a touch panel according to an embodiment of the present invention is mounted.

FIG. 1 is a block diagram illustrating a schematic structure of a display with a touch panel on which a touch panel according to the embodiment of the present invention is mounted.

In FIG. 1, a touch panel 106 is a capacitance type touch panel of this embodiment. As described below, the touch panel 106 includes X electrodes and Y electrodes for detecting capacitances.

The touch panel 106 is arranged in front of a display panel 101. Therefore, in order to enable an image displayed on the display panel 101 to be viewed by a user, the displayed image is required to transmit through the touch panel 106. Therefore, the touch panel 106 is desired to have a high light transmittance.

The X electrodes and the Y electrodes of the touch panel 106 are connected to a touch panel control portion 108 through wiring 107. The Y electrodes are used as scanning electrodes while the X electrodes are used as detection electrodes. The touch panel control portion 108 applies a drive voltage to the Y electrodes in turns, thereby measuring inter-electrode capacitances at respective electrode intersections. Then, the touch panel control portion 108 calculates input coordinates from capacitance detection signals which vary depending on the capacitance values of the respective electrode intersections. The touch panel control portion 108 uses an I/F signal 109 to transfer the input coordinates to a system control portion 105.

When the input coordinates are transferred from the touch panel 106 by a touch operation, the system control portion 105 generates a display control signal 104 for displaying an image in accordance with the touch operation, and transfers the generated display control signal 104 to a display control circuit 103.

The display control circuit 103 generates a display signal 102 based on the display control signal 104 and outputs the display signal 102 to the display panel 101. The display panel 101 displays an image based on the display signal 102.

Note that, any kind of display panel can be used as long as the display panel 101 can be used with the touch panel 106, and the display panel is not limited to a liquid crystal display panel. Alternatively, as the display panel 101, it is possible to use a display panel using an organic light emitting diode element or a surface-conduction electron emitter, or an organic EL display panel.

When a liquid crystal display panel is used as the display panel 101, a backlight unit (not shown) is arranged below a surface of the liquid crystal display panel on a side opposite to the image display surface. The liquid crystal display panel used in this case is, for example, an IPS type, TN type, or VA type liquid crystal display panel.

As is well known, the liquid crystal display panel is formed by adhering two substrates arranged opposed to each other, and polarizing plates are provided on outer sides of the two substrates, respectively.

Figure 2:
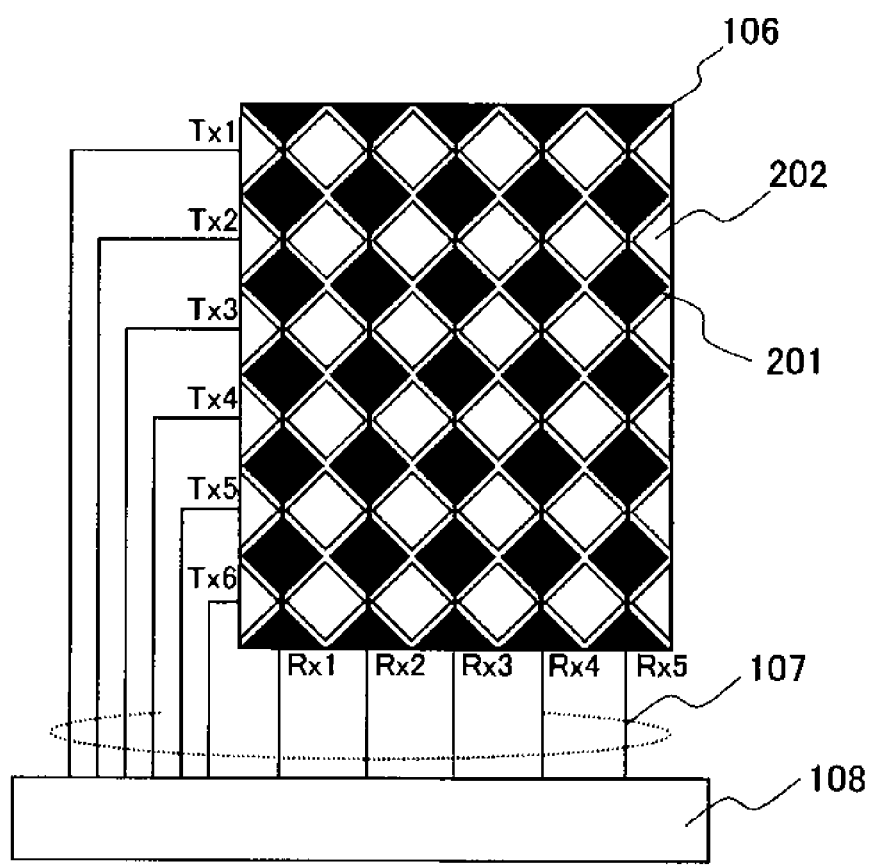
FIG. 2 is a schematic view illustrating an electrode pattern of the touch panel according to the embodiment of the present invention.

FIG. 2 is a schematic view illustrating an electrode pattern of the touch panel according to the embodiment of the present invention.

As illustrated in FIG. 2, the touch panel 106 of this embodiment includes TX1 to TX6 as Y electrodes 201 and RX1 to RX5 as X electrodes 202. In this case, for example, five X electrodes 202 and six Y electrodes 201 are illustrated in FIG. 2, but the numbers of the electrodes are not limited thereto.

The touch panel 106 of this embodiment has, for example, a structure in which the Y electrodes 201, an interlayer insulating film (not shown), the X electrodes 202, and a protective film (not shown) are stacked in this order on a touch panel substrate.

Figure 3:
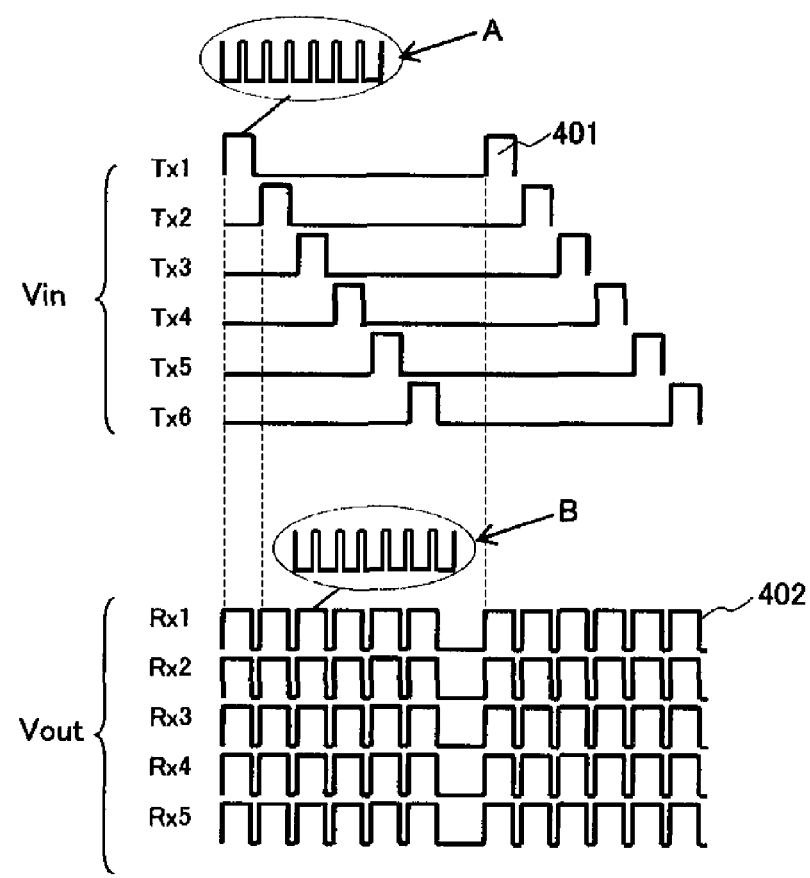
FIG. 3 is a schematic signal waveform chart of drive signals and detection signals when there is no input to the capacitance type touch panel.

FIG. 3 is a schematic signal waveform chart of drive signals and detection signals when there is no input to the capacitance type touch panel 106. In the waveform chart shown in FIG. 3, the horizontal axis represents time while the vertical axis represents amplitude.

As shown in FIG. 3, a drive voltage (drive signal) 401 is sequentially applied to TX1 to TX6 as the Y electrodes 201 for each one scanning period. The waveform of a detection signal 402 detected at RX1 to RX5 as the X electrodes 202 varies in synchronization with the input of the drive voltage. In FIG. 3, there is no input to the touch panel 106, and thus, the amplitude of the detection signals detected at the X electrodes RX1 to RX5 does not vary greatly.

Figure 4:
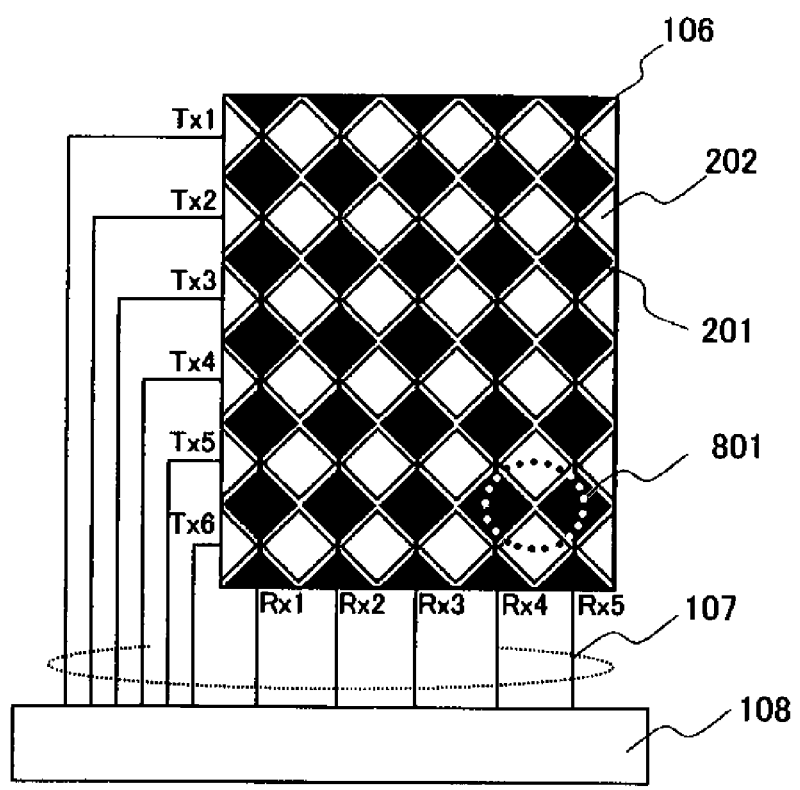
FIG. 4 is a schematic view illustrating an electrode pattern and an exemplary touch position of the touch panel.

FIG. 4 is a schematic view illustrating an electrode pattern and an exemplary touch position of the touch panel. In FIG. 4, as the exemplary touch position on the touch panel 106, a position is indicated by a broken-line circle 801.

Figure 5:
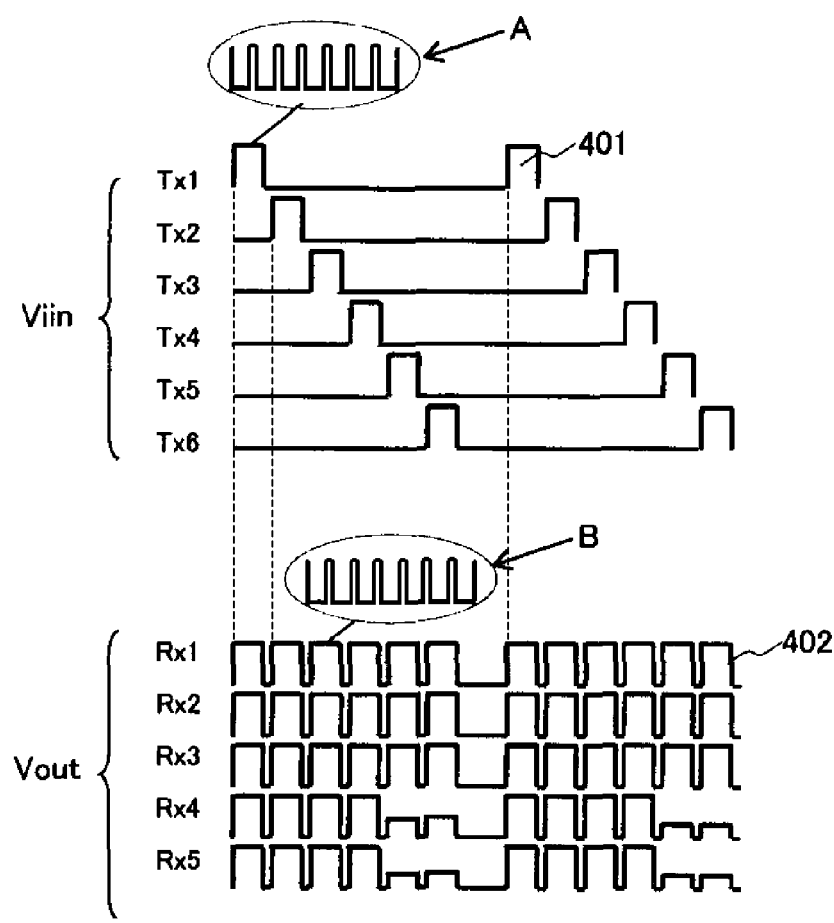
FIG. 5 is a schematic signal waveform chart of drive signals and detection signals when there is an input to the capacitance type touch panel.

FIG. 5 is a schematic signal waveform chart of drive signals and detection signals when there is a touch input at the position illustrated in FIG. 4. In the waveform chart of FIG. 5, the horizontal axis represents time while the vertical axis represents amplitude. As described with reference to FIG. 3, the drive voltage 401 is sequentially input to the Y electrodes TX1 to TX6 for each one scanning period. With regard to the waveform of the detection signals 402 detected at the X electrodes RX1 to RX5, the signal amplitude varies at the position indicated by the broken-line circle 801 in FIG. 4, that is, at portions corresponding to the Y electrode TX5 and the X electrodes RX4 and RX5 and portions corresponding to the Y electrode TX6 and the X electrodes RX4 and RX5. By extracting and processing the variations, input coordinates may be obtained.

Note that, as shown as waveforms A with the enlarged time axis in FIG. 3 and FIG. 5, the drive signal 401 which is sequentially input to the Y electrodes TX1 to TX6 for each one scanning period is a pulse train of a plurality of pulses. In accordance with this, as shown as waveforms B with the enlarged time axis in FIG. 3 and FIG. 5, the detection signal 402 which is detected at the X electrodes RX1 to RX5 is also a pulse train of a plurality of pulses.

When there is noise generated by the display panel 101, according to the conventional detecting method, for example, the original signal level is buried in the noise, and thus, the original signal (detection signal 402) cannot be extracted from the detection signals detected at the X electrodes 202. (Principle of Noise Removal of Touch Panel of this Embodiment)

According to the present invention, there is provided a noise removing method of removing noise superimposed on a randomly generated and randomly varying signal to be detected, thereby realizing a high signal-to-noise (SN) ratio.

In order to obtain a high SN ratio, according to the present invention, signals with noise superimposed thereon are sampled at a plurality of different frequencies simultaneously over the same time period to obtain signal sequences. Then, a frequency spectrum is calculated with regard to each signal sequence, and signal strengths are compared among the frequency spectra with regard to the respective frequencies. With regard to frequency components having different strengths between the frequency spectra, correction is made to make the strength appropriate, thereby removing the noise.

Generally, an analog filter (low-pass filter) is provided at an input stage of a signal processing system, and an analog-to-digital converter is provided at a subsequent stage. However, when the analog-to-digital converter samples a signal, a frequency component which is higher than a specific frequency defined by the sampling frequency (Nyquist frequency) is folded back to the lower frequency side with the Nyquist frequency being the symmetry axis, and is mixed in the pass band of the filter as noise.

In order to prevent this, it is necessary to narrow the band of the filter or to increase the sampling frequency. However, if the band of the filter is narrowed, a frequency component of a target signal is also lost, and thus, the correct behavior of the target signal cannot be observed. On the other hand, in order to increase the sampling frequency, a measurement circuit system with high precision and high speed response is necessary. It is thus difficult to accomplish the noise removal within a fixed cost range.

Figure 6:
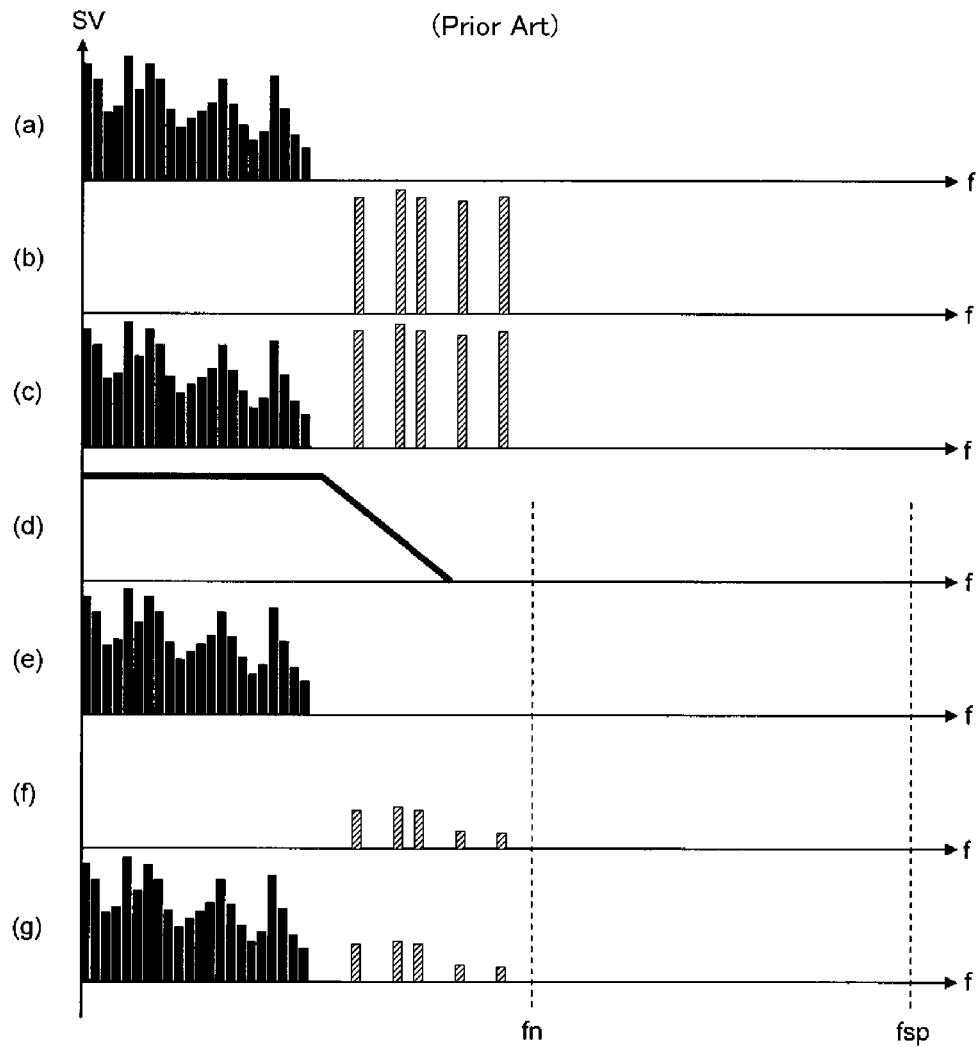
FIG. 6 shows an exemplary change in signal frequency components associated with a conventional signal processing process.

FIG. 6 shows an exemplary change in signal frequency components associated with a conventional signal processing process. FIG. 6, and FIGS. 7 to 9 to be described below show frequency spectra. In those figures, the vertical axis represents a signal strength SV while the horizontal axis represents a frequency f, and fsp represents sampling frequency while fn represents Nyquist frequency.

In FIG. 6, a spectrum (a) is a frequency spectrum of a target signal, a spectrum (b) is a frequency spectrum of noise, a spectrum (c) is a frequency spectrum of the signal with the noise superimposed thereon, and a spectrum (d) is frequency characteristics of the analog filter (low-pass filter) provided at the signal processing input stage.

A spectrum (e) in FIG. 6 is a frequency spectrum of the target signal after the target signal passes through the analog filter. In the example shown in FIG. 6, the pass band of the analog filter (low-pass filter) is set to be broader than the frequency spectrum of the target signal, and thus, there is no change in spectrum of the target signal before and after the target signal passes through the filter.

A spectrum (f) in FIG. 6 is a frequency spectrum of the noise after the noise passes through the analog filter. In the example shown in FIG. 6, the noise exists in an attenuation band of the analog filter, and thus, the signal strength of the noise after the noise passes through the filter decreases compared with the signal strength of the noise before the noise passes through the filter.

A spectrum (g) in FIG. 6 is a frequency spectrum of the signal after the sampling. In the example shown in FIG. 6, the sampling frequency (fsp) is high and both the target signal and the noise exist within the Nyquist frequency (fn), and thus, no folding back is caused. Therefore, the noise and the target signal may be separated from each other by additional processing.

Figure 7:
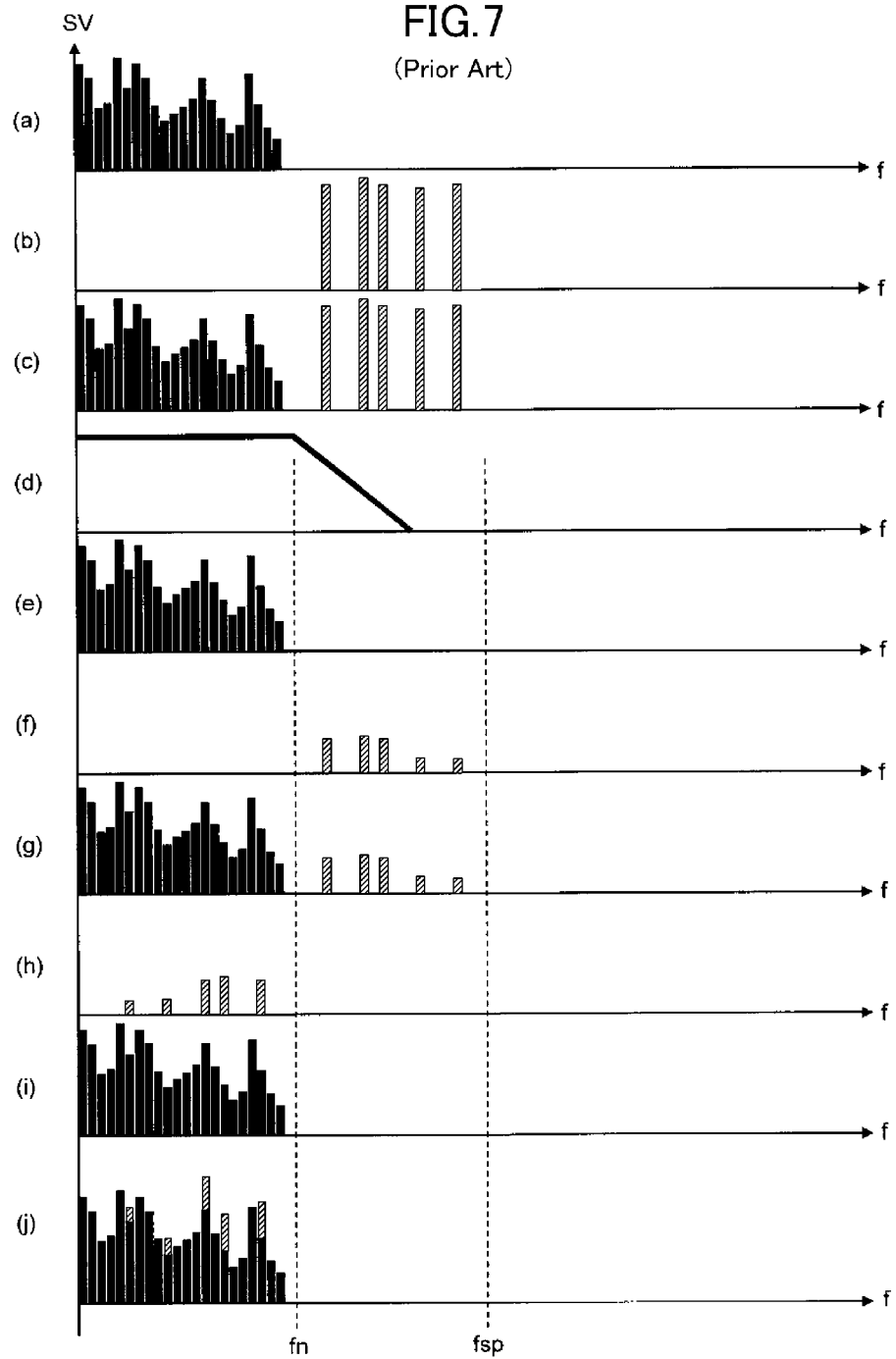
FIG. 7 shows another exemplary change in signal frequency components associated with the conventional signal processing process.

FIG. 7 shows another exemplary change in signal frequency components associated with the conventional signal processing process.

In FIG. 7, a spectrum (a) is a frequency spectrum of a target signal, a spectrum (b) is a frequency spectrum of noise, a spectrum (c) is a frequency spectrum of the signal with the noise superimposed thereon, and a spectrum (d) is frequency characteristics of the analog filter (low-pass filter) provided at the signal processing input stage.

A spectrum (e) in FIG. 7 is a frequency spectrum of the target signal after the target signal passes through the analog filter. In the example shown in FIG. 7, the pass band of the analog filter (low-pass filter) is set to be broader than the frequency spectrum of the target signal, and thus, there is no change in spectrum of the target signal before and after the target signal passes through the filter.

A spectrum (f) in FIG. 7 is a frequency spectrum of the noise after the noise passes through the analog filter. In the example shown in FIG. 7, the noise exists in an attenuation band of the analog filter, and thus, the signal strength of the noise after the noise passes through the filter decreases compared with the signal strength of the noise before the noise passes through the filter.

A spectrum (g) in FIG. 7 is a spectrum of the entire signal at a sampling input stage, and a spectrum (h) is a frequency spectrum of the noise after the sampling. In the example shown in FIG. 7, the sampling frequency (fsp) is low, and thus, the noise exists in a band higher than the Nyquist frequency (fn). Therefore, the noise components are folded back to a frequency region lower than the Nyquist frequency (fn).

A spectrum (i) in FIG. 7 is a frequency spectrum of the target signal after the sampling. In the example shown in FIG. 7, the target signal exists in a frequency band lower than the Nyquist frequency (fn), and thus, no folding back is caused.

A spectrum (j) in FIG. 7 is a frequency spectrum of the entire signal obtained by the sampling. The frequency spectrum of the noise which is folded back is superimposed on the target signal which is sampled without being folded back. Therefore, the noise and the target signal cannot be separated from each other even by additional processing.

Figure 8:
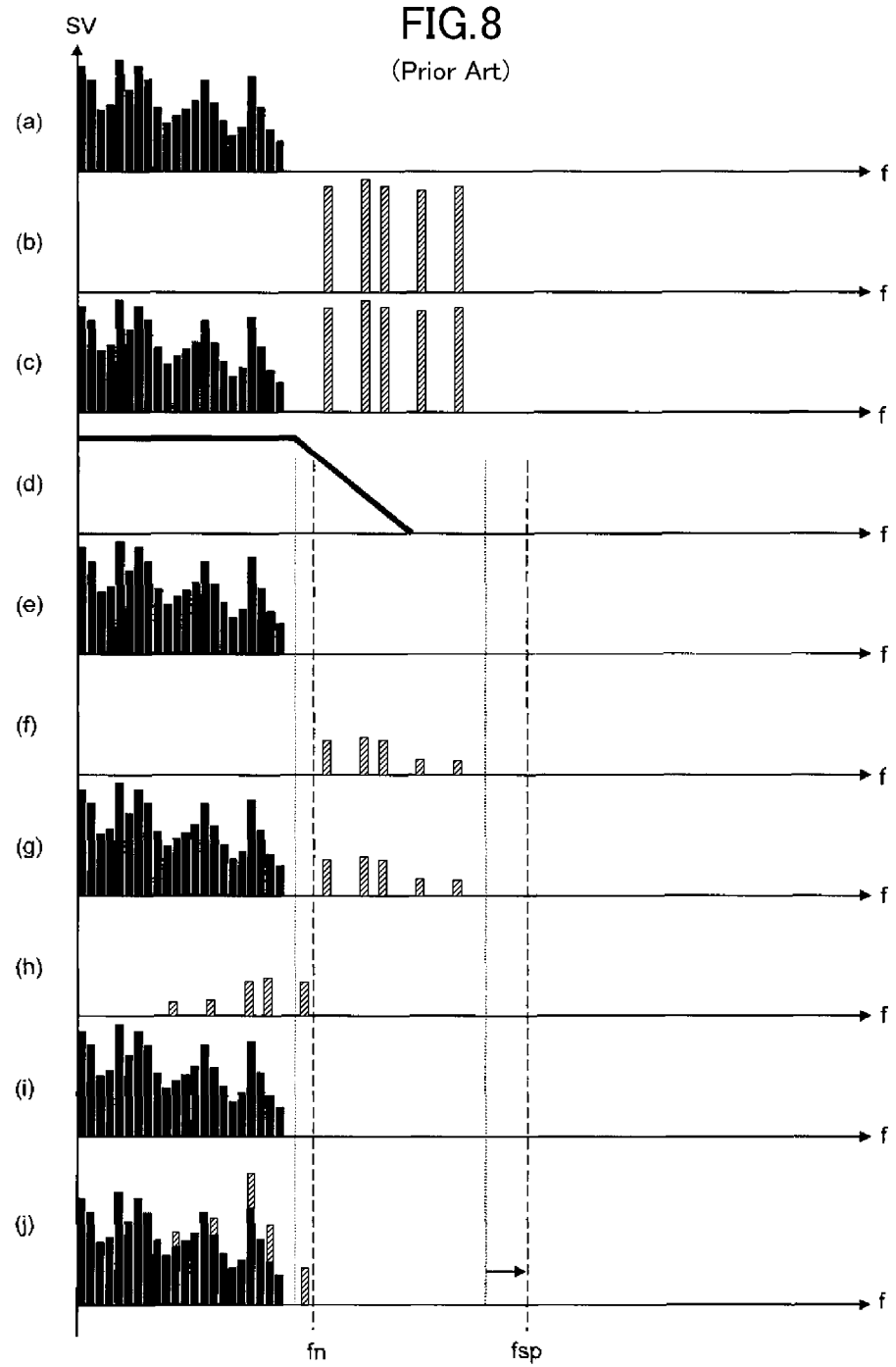
FIG. 8 shows still another exemplary change in signal frequency components associated with the conventional signal processing process.

FIG. 8 shows still another exemplary change in signal frequency components associated with the conventional signal processing process.

In FIG. 8, a spectrum (a) is a frequency spectrum of a target signal, a spectrum (b) is a frequency spectrum of noise, a spectrum (c) is a frequency spectrum of the signal with the noise superimposed thereon, and a spectrum (d) is frequency characteristics of the analog filter (low-pass filter) provided at the signal processing input stage.

A spectrum (e) in FIG. 8 is a frequency spectrum of the target signal after the target signal passes through the analog filter. In the example shown in FIG. 8, the pass band of the analog filter is set to be broader than the frequency spectrum of the target signal, and thus, there is no change in spectrum of the target signal before and after the target signal passes through the filter.

A spectrum (f) in FIG. 8 is a frequency spectrum of the noise after the noise passes through the analog filter. In the example shown in FIG. 8, the noise exists in an attenuation band of the analog filter, and thus, the signal strength of the noise after the noise passes through the filter decreases compared with the signal strength of the noise before the noise passes through the filter.

A spectrum (g) in FIG. 8 is a spectrum of the entire signal at a sampling input stage, and a spectrum (h) is a frequency spectrum of the noise after the sampling. In the example shown in FIG. 8, the sampling frequency (fsp) is low, and thus, the noise exists in a band higher than the Nyquist frequency (fn). Therefore, the noise components are folded back to a frequency region lower than the Nyquist frequency (fn). However, the sampling frequency (fsp) of this example is different from that of the example shown in FIG. 7, and thus, the Nyquist frequency (fn) is also different and the position along which the folding back is caused is different.

A spectrum (i) in FIG. 8 is a frequency spectrum of the target signal after the sampling. In the example shown in FIG. 8, the target signal exists in a frequency band lower than the Nyquist frequency (fn), and thus, no folding back is caused.

A spectrum (j) in FIG. 8 is a frequency spectrum of the entire signal obtained by the sampling. In the example shown in FIG. 8, similarly to the case of the example shown in FIG. 7, the frequency spectrum of the noise which is folded back is superimposed on the target signal which is sampled without being folded back. However, the position along which the folding back is caused differs between the example shown in FIG. 8 and the example shown in FIG. 7, and thus, the position at which the noise that is folded back is superimposed also differs. However, it is similar to the example shown in FIG. 7 that the noise and the target signal cannot be separated from each other even by additional processing.

Figure 9:
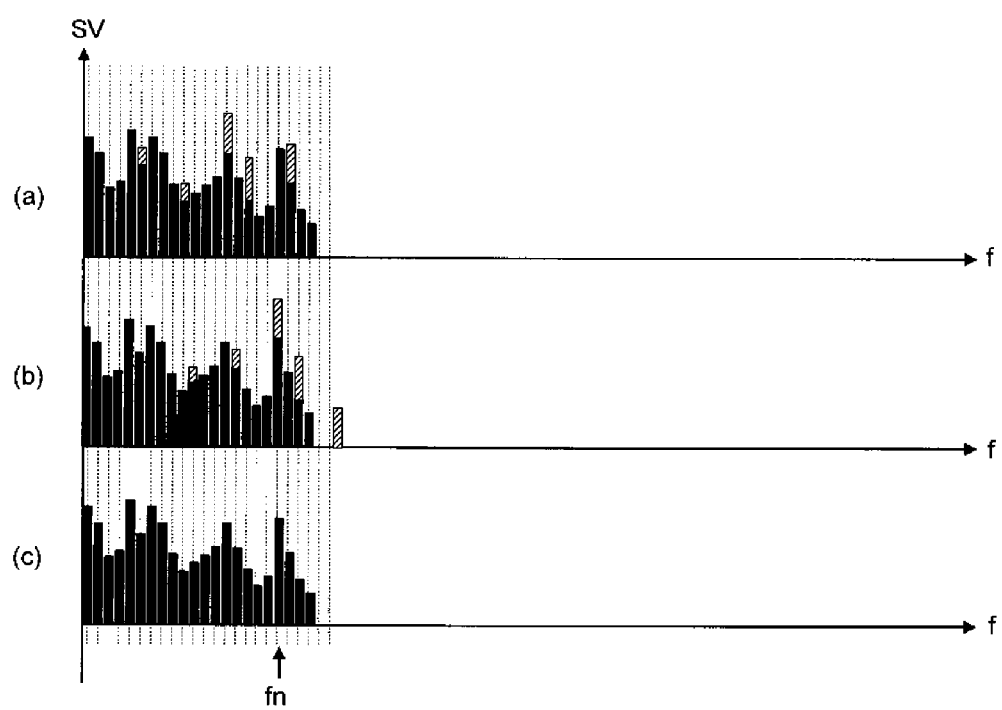
FIG. 9 shows a method of removing noise according to the present invention, and shows an exemplary change in signal frequency components associated with a signal processing process.

FIG. 9 shows a method of removing noise according to the present invention, and shows an exemplary change in signal frequency components associated with a signal processing process.

A spectrum (a) in FIG. 9 is a frequency spectrum of the entire signal obtained by sampling at the sampling frequency described with reference to FIG. 7, and corresponds to the spectrum (j) in FIG. 7.

A spectrum (b) in FIG. 9 is a frequency spectrum of the entire signal obtained by sampling at the sampling frequency described with reference to FIG. 8, and corresponds to the spectrum (j) in FIG. 8. This is compared with the frequency spectrum of the spectrum (a) in FIG. 9. The target signal is the same, but the frequency components of the noise that are folded back are superimposed on the target signal at different positions. Therefore, it is clear that, by comparing the two, the noise may be discriminated.

A spectrum (c) in FIG. 9 is a frequency spectrum of the signal after the noise is removed. For example, the signal strength at the frequency fn is compared between the spectrum (a) and the spectrum (b) in FIG. 9. The signal strength at this frequency differs between the spectrum (a) and the spectrum (b). This suggests that noise is superimposed on the signal. Assuming that the lower one of the signal strengths in comparison is correct, the lower signal strength is regarded as the signal strength at this frequency. By making similar determination with regard to all the frequencies, noise removal is achieved.

FIG. 10 is a schematic view for illustrating the method of removing noise of the touch panel according to the embodiment of the present invention. The method of removing noise according to this embodiment includes roughly four processing procedures.

Procedure 1 is sampling of input signals. Input signals in which noise is superimposed on the target signal are sampled at a plurality of different sampling periods (in FIG. 10, two periods of Period A and Period B) simultaneously over the same time period. In this way, in this Procedure 1, Data Sequence A and Data Sequence B are generated. Note that, in FIG. 10, the sampling time period is the same.

Procedure 2 is a procedure for converting a time signal into a frequency signal. Specifically, Fourier transform is performed. As a result, the frequency spectrum of Data Sequence A and the frequency spectrum of Data Sequence B are generated.

Procedure 3 is a procedure for removing noise. The signal strength of each frequency component is compared between the frequency spectrum of Data Sequence A and the frequency spectrum of Data Sequence B. When there is a difference in signal strength between the frequency spectrum of Data Sequence A and the frequency spectrum of Data Sequence B, it is estimated that the lower signal strength is correct, and a frequency spectrum is generated in which frequency components having different signal strengths have been adjusted to have the signal strength which is assumed to be correct. For example, with regard to the frequency components in the frequency spectrum of Data Sequence A (or the frequency spectrum of Data Sequence B), the strength of frequency components having different signal strengths between the frequency spectrum of Data Sequence A and the frequency spectrum of Data Sequence B is adjusted to be the lower signal strength of Data Sequence A and Data Sequence B.

In this embodiment, there are two frequency spectra to be compared, and thus, the magnitude is compared. When there are three or more frequency spectra to be compared, the signal strength to be regarded as correct may be the lowest strength, the average of the signal strengths, or the like, and any one of those may be adopted in the light of the object of the present invention.

As a result, the frequency spectrum after the processing of removing the noise components is obtained.

Procedure 4 is a procedure for regenerating a time signal. This procedure is a procedure for converting the frequency spectrum obtained in Procedure 3 into a time signal. Specifically, inverse Fourier transform is performed. As a result, a signal from which noise is removed and which is mainly formed of the target signal is obtained.

Note that, Procedures 2 to 4 described above are performed through digital signal processing after analog-to-digital conversion of Data Sequence A and Data Sequence B into digital values is performed.

Figure 11:
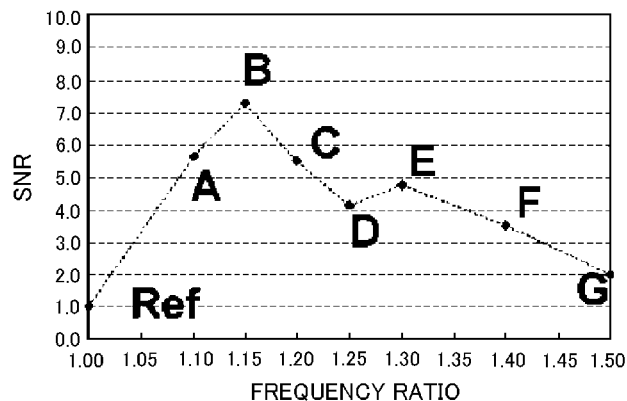
FIG. 11 is a graph showing the relationship between a noise removing effect and a sampling frequency in the touch panel of this embodiment.

FIG. 11 is a graph showing the relationship between the noise removing effect and the sampling frequency in the touch panel of this embodiment. In the graph of FIG. 11, the horizontal axis represents a ratio between the sampling period of Data Sequence A and the sampling period of Data Sequence B (frequency ratio), while the vertical axis represents a signal-to-noise ratio (SNR) of an output signal. Note that, the ratio between the sampling period of Data Sequence A and the sampling period of Data Sequence B is expressed as (sampling period of Data Sequence B)/(sampling period of Data Sequence A).

Figure 12:
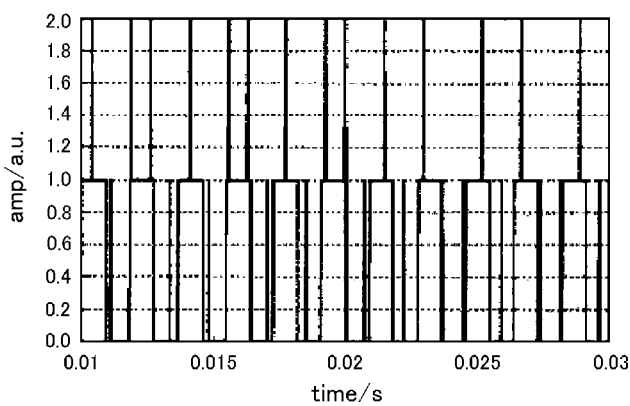
FIG. 12 is a signal waveform chart of exemplary output signals under a state in which no noise removal is applied.
Figure 13:
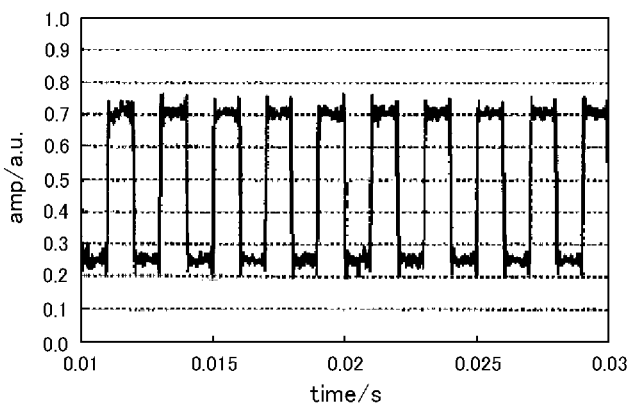
FIG. 13 is a waveform chart of output signals giving a measurement point A in FIG. 11.
Figure 14:
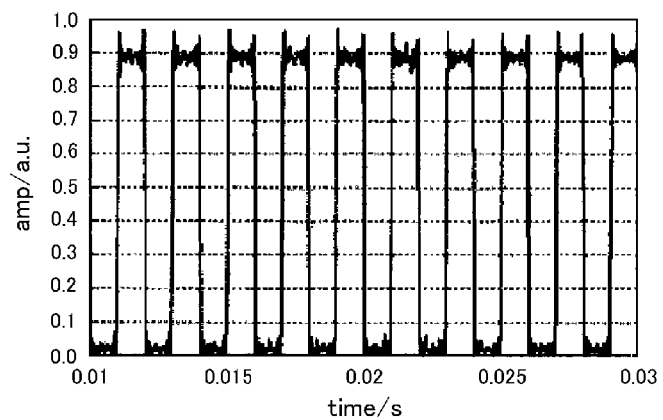
FIG. 14 is a waveform chart of output signals giving a measurement point B in FIG. 11.
Figure 15:
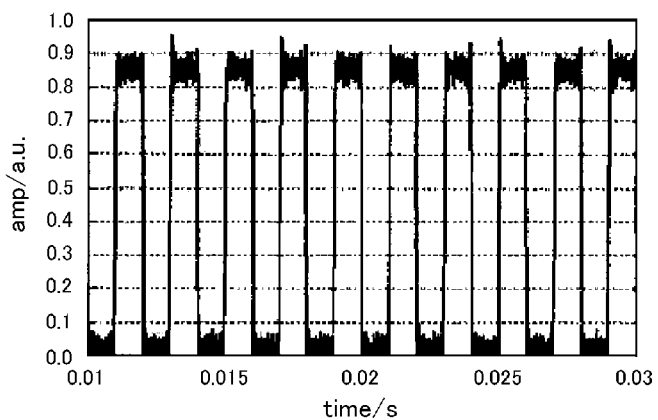
FIG. 15 is a waveform chart of output signals giving a measurement point C in FIG. 11.
Figure 16:
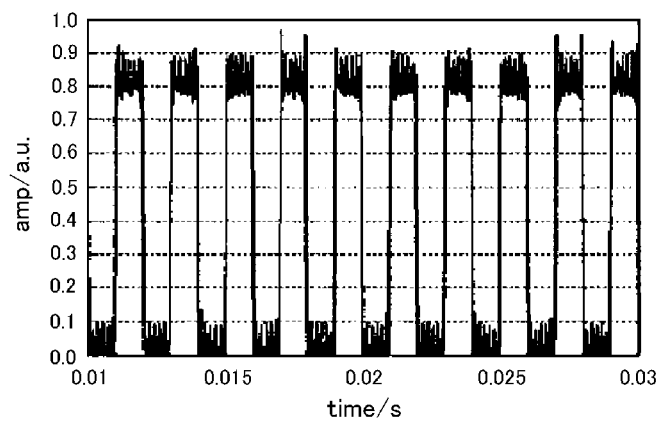
FIG. 16 is a waveform chart of output signals giving a measurement point D in FIG. 11.
Figure 17:
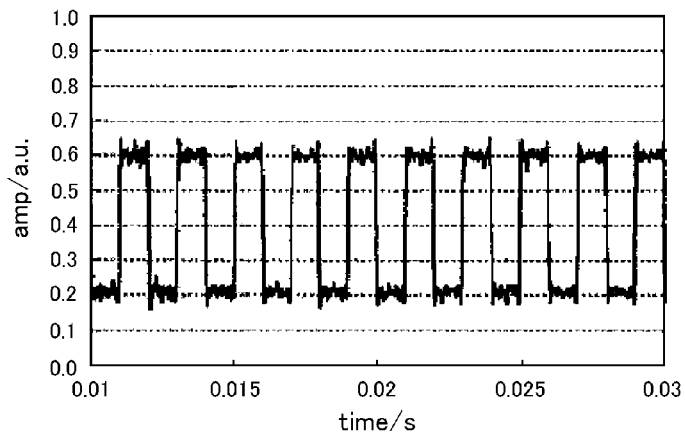
FIG. 17 is a waveform chart of output signals giving a measurement point E in FIG. 11.
Figure 18:
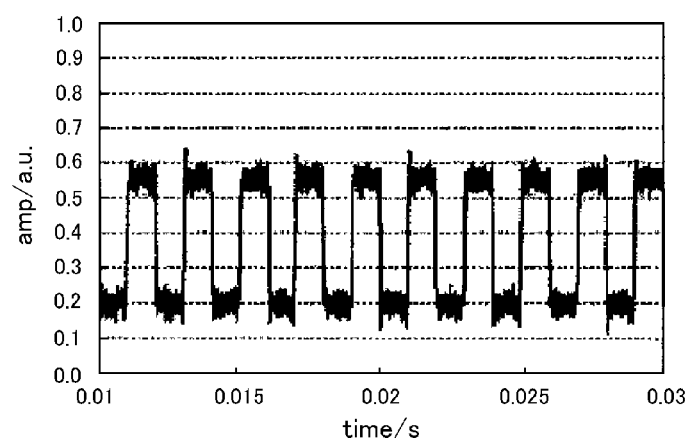
FIG. 18 is a waveform chart of output signals giving a measurement point F in FIG. 11.
Figure 19:
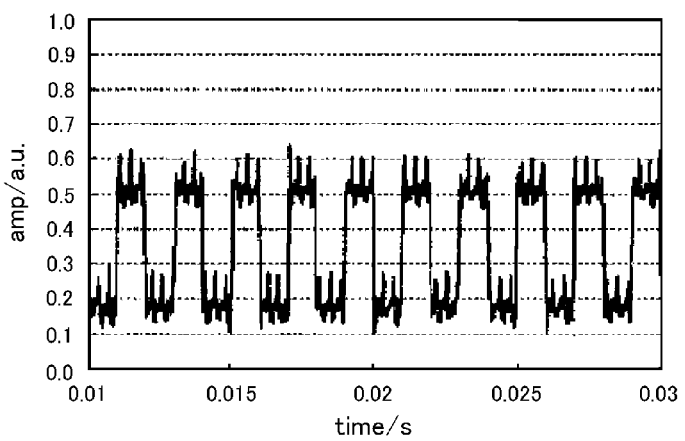
FIG. 19 is a waveform chart of output signals giving a measurement point G in FIG. 11.

FIG. 12 shows exemplary output signals under a state in which no noise removal is applied, which is shown as a measurement point Ref in FIG. 11. FIGS. 13 to 19 show exemplary waveforms of output signals when the noise removal according to this embodiment is applied with different frequency ratios. FIGS. 13 to 19 correspond to measurement points A to G, respectively, in FIG. 11.

From the graph of FIG. 11, it can be seen that the noise removing effect of this embodiment depends on the ratio between the sampling period of Data Sequence A and the sampling period of Data Sequence B, and becomes maximum when the ratio becomes a specific ratio.

The ratio between the sampling periods when the obtained effect becomes maximum depends on the frequencies of the target signal and the noise, and thus, when the signal processing according to this embodiment is applied, processing for optimizing the frequency ratio as an adjustable parameter is inevitably involved.

A method of generating Data Sequence A and Data Sequence B in the touch panel according to the present invention is described with reference to FIGS. 20 and 21.

Figure 20:
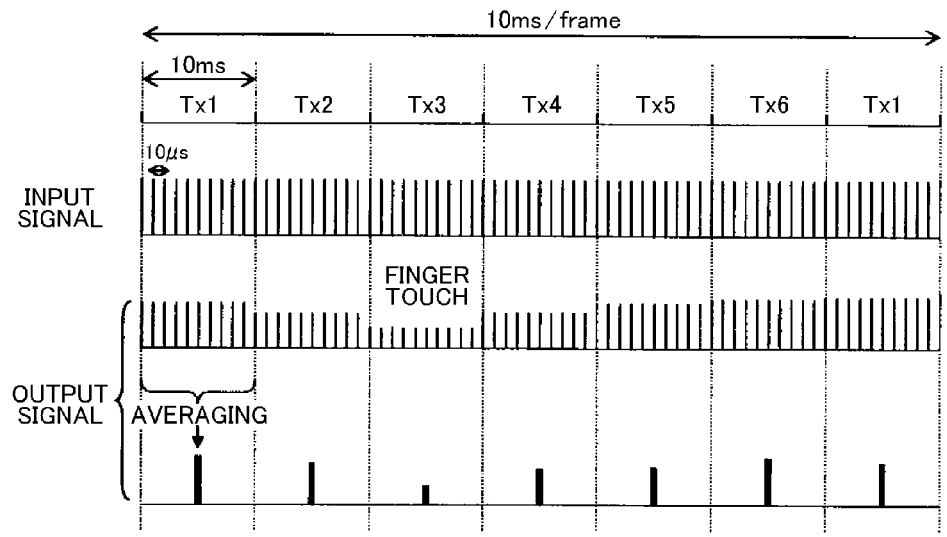
FIG. 20 is a schematic timing chart showing details of a detecting method of a conventional touch panel.

FIG. 20 is a schematic timing chart showing details of a detecting method of a conventional touch panel. With regard to a drive voltage, a pulse train having a period of 10 µs is applied to the Y electrodes TX1 to TX6 for each one scanning period (TX) of 1 ms in turns. Further, the round of the scanning periods (TX) is defined as a frame. Detection signals (output signals) are shown with attention being focused on one X electrode.

In synchronization with the input signals of the pulse train to the Y electrodes TX1 to TX6, output signals are generated as pulse signals at the X electrodes. Even when the Y electrode to which an input signal is applied is changed, when attention is focused on one X electrode, the output signal is regarded as continuous pulse signals.

Conventionally, processing is performed where the continuous pulse signals are averaged for each one scanning period (TX) during which the input signals are applied, thereby combining the signals into one output signal (so-called detection signal). The purpose is to reduce noise by the averaging processing.

Figure 21:
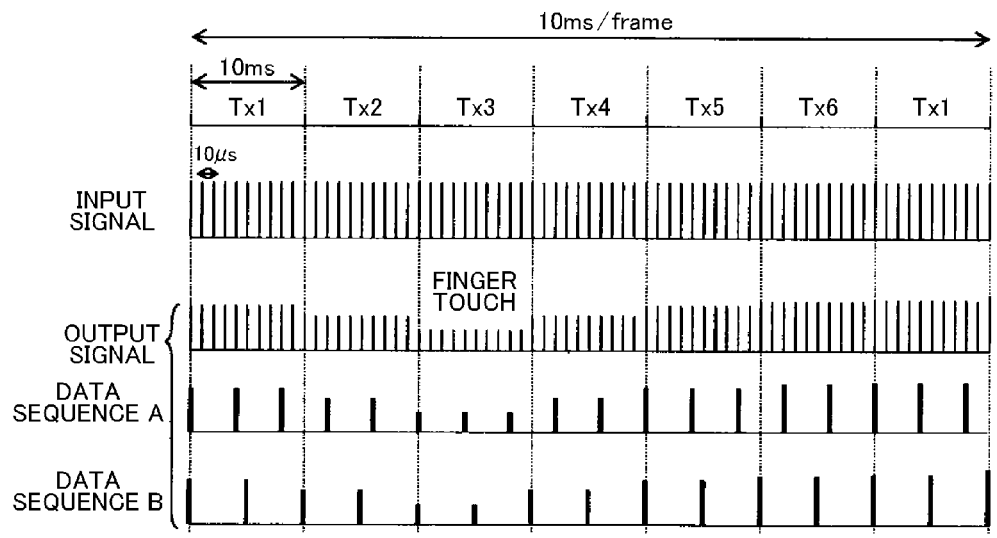
FIG. 21 is a schematic timing chart showing details of a detecting method of the touch panel according to the embodiment of the present invention.

FIG. 21 is a schematic timing chart showing details of a detecting method of the touch panel according to the present invention. The input signals of the pulse train to the Y electrodes TX1 to TX6 and the output signals obtained when attention is focused on one X electrode are the same as those of the conventional case shown in FIG. 20.

As described above, conventionally, processing for reducing noise is performed by averaging the continuous pulse signals for each one scanning period (TX) during which the input signals are applied, thereby combining the signals into one output signal. On the other hand, according to this embodiment, output signals are extracted at different intervals from a pulse train of output signals generated with the input pulse period (10 µs in this embodiment) to generate Data Sequence A and Data Sequence B. This corresponds to Procedure 1 described with reference to FIG. 10. After that, by processing the obtained data sequence according to the procedures illustrated in FIG. 10, noise removal may be achieved.

Figure 22:
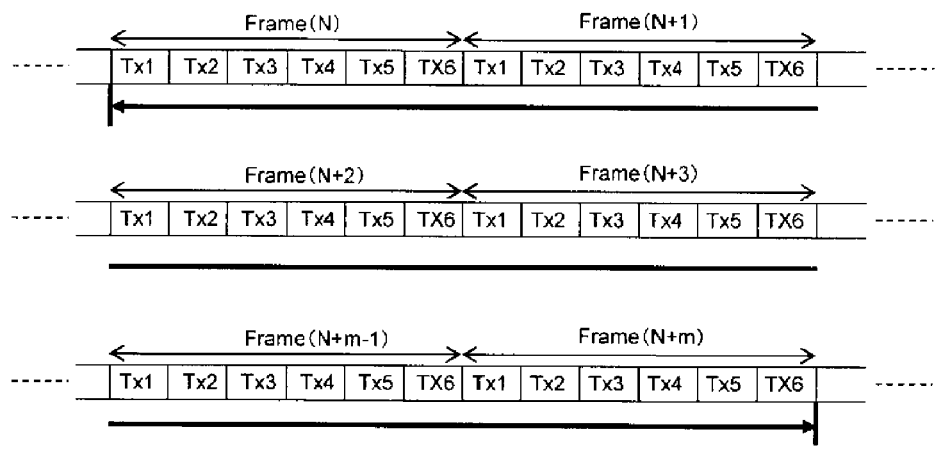
FIG. 22 shows a noise detecting period in the touch panel according to the embodiment of the present invention.
Figure 23:
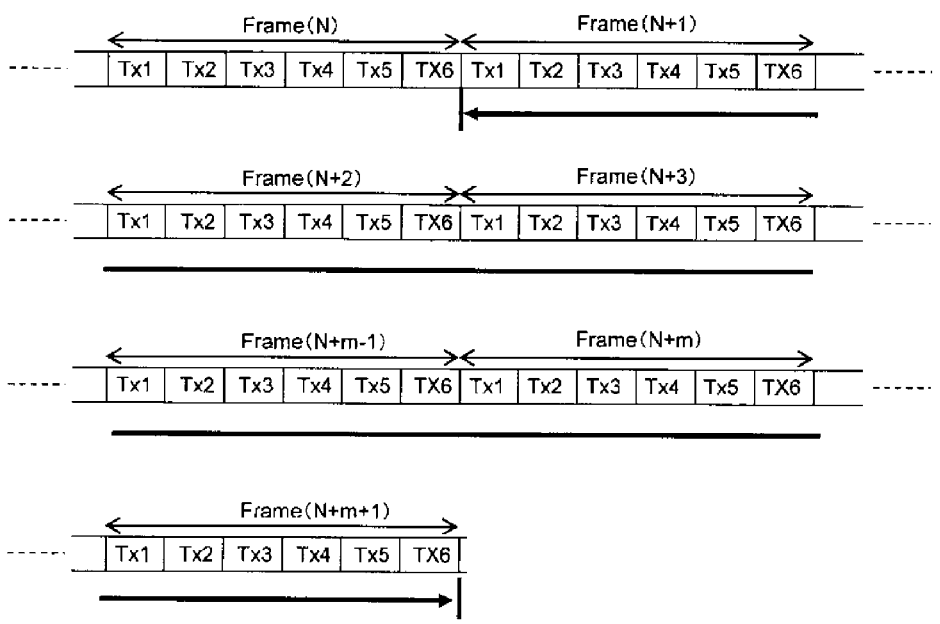
FIG. 23 shows another noise detecting period in the touch panel according to the embodiment of the present invention.

FIGS. 22 and 23 are timing charts showing a noise detecting period in the touch panel according to the embodiment of the present invention. In each of the figures, a series of time periods over a plurality of frames is illustrated over a plurality of rows.

In the method of removing noise according to this embodiment, a signal is converted from within a time region into within a frequency region. The frequency resolution of a signal in a frequency region (frequency region signal) is the inverse of the length of a signal in a time region (time region signal) before the conversion.

Therefore, to obtain a frequency region signal having high resolution after the conversion, a long time region signal is necessary. This may be realized by preparing signals over a plurality of frames as a time region signal before the conversion.

In the case illustrated in FIG. 22, the latest frame is Frame (N+m). Signals from Frame (N) to the latest Frame (N+m) are handled as a continuous time region signal.

In the case illustrated in FIG. 23, the latest frame is Frame (N+m+1). Signals from Frame (N+1) to the latest Frame (N+m+1) are handled as a continuous time region signal.

An effect obtained by the exemplary embodiment of the invention disclosed herein is briefly described as follows.

According to the present invention, a touch panel with improved anti-noise performance can be provided.

The invention made by the inventor of the present invention has been specifically described above based on the above-mentioned embodiment, but the present invention is not limited to the embodiment and it should be understood that various modifications are possible within the gist of the present invention.

What is claimed is:
1. A touch panel, comprising:
a plurality of scanning electrodes;
a plurality of detection electrodes which intersect the plurality of scanning electrodes; and
a touch panel controller configured to perform a coordinate determination procedure by:
inputting a continuous drive pulse train to the plurality of scanning electrodes for each one scanning period in turns;

extracting pulses at different intervals from a continuous detection pulse train detected by the plurality of detection electrodes, and for generating at least two data sequences;

generating a frequency spectrum of each of the at least two data sequences;

comparing a signal strength of each frequency component between the frequency spectra of the at least two data sequences, and generating a frequency spectrum in which frequency components having different strengths have been corrected; and generating a detection signal from the frequency spectrum in which high frequency components having different strengths have been connected;

wherein the touch panel controller is configured so that intervals of extracting a pulse are adjustable for each of the at least two data sequences according to a frequency of a target signal to be detected.

2. The touch panel according to claim 1, wherein the touch panel controller is configured to generate the frequency spectrum from the each of the at least two data sequences over a plurality of frame periods.

3. The touch panel according to claim 1, wherein the touch panel controller is configured to perform Fourier transform on each of the at least two data sequences to generate frequency spectra of the at least two data sequences, respectively.

4. The touch panel according to claim 1, wherein the touch panel controller is configured to compare a signal strength of each frequency component between the frequency spectra of the at least two data sequences, and adopt, as the signal strength of the frequency components having different strengths, one of a lowest value of the signal strength and an average value of the signal strength between frequency components of the frequency spectra of the at least two data sequences.

5. The touch panel according to claim 1, wherein the touch panel controller is configured to perform inverse Fourier transform on the frequency spectrum to generate a detection signal.

6. The touch panel according to claim 1, wherein the at least two data sequences comprise two data sequences of a first data sequence and a second data sequence.

7. The touch panel according to claim 6, wherein the touch panel controller is configured to perform Fourier transform on the first data sequence and the second data sequence to generate the frequency spectrum of the first data sequence and the frequency spectrum of the second data sequence.

8. The touch panel according to claim 6, wherein the touch panel controller is configured to compare the signal strength of each frequency component between the frequency spectrum of the first data sequence and the frequency spectrum of the second data sequence, and adopt, as the signal strength of the frequency components having different strengths, a value of a lower signal strength of the frequency components of the frequency spectrum of the first data sequence and the frequency components of the frequency spectrum of the second data sequence.

9. The touch panel according to claim 1, wherein the touch panel does not comprise a shielding electrode on a surface thereof on a display panel side, the touch panel being mountable on the display panel.

* * * * *